Sept. 24, 1929.  J. RAICK  1,729,052
AGITATOR
Filed June 28, 1926  2 Sheets-Sheet 1

INVENTOR
J. Raick
by Jno. T. Irvine
atty.

Sept. 24, 1929. J. RAICK 1,729,052
AGITATOR
Filed June 28, 1926 2 Sheets-Sheet 2
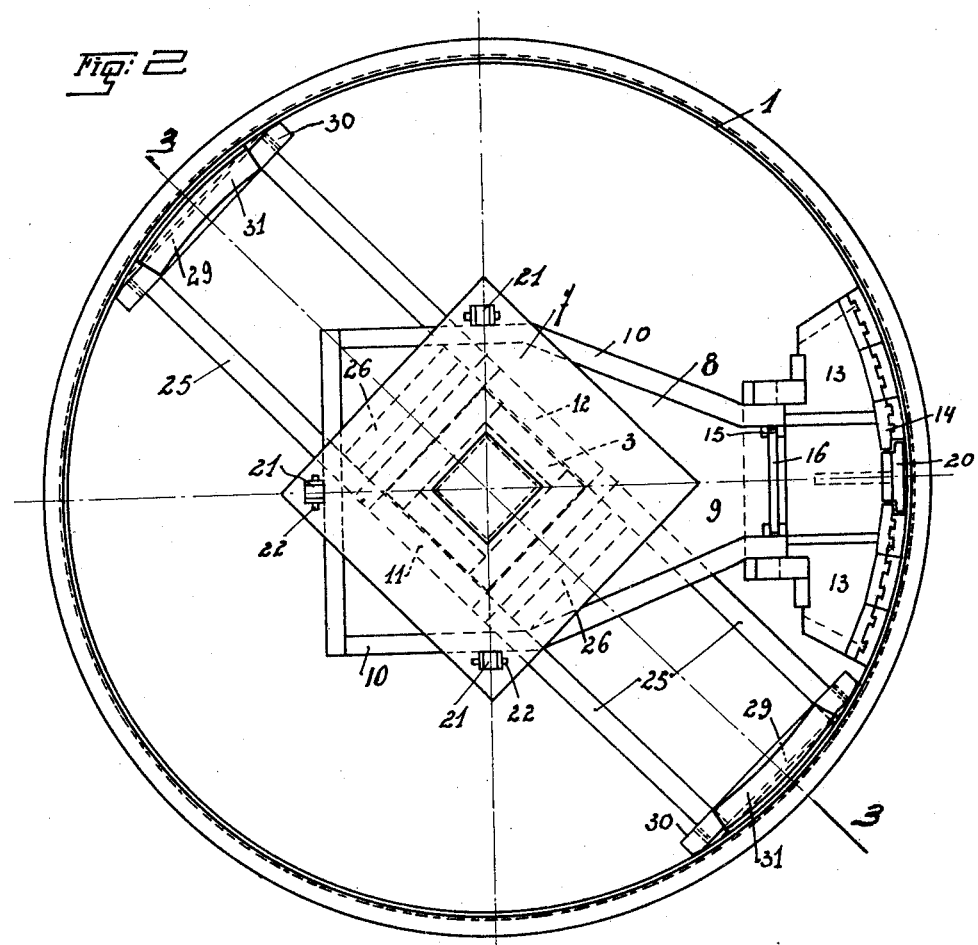
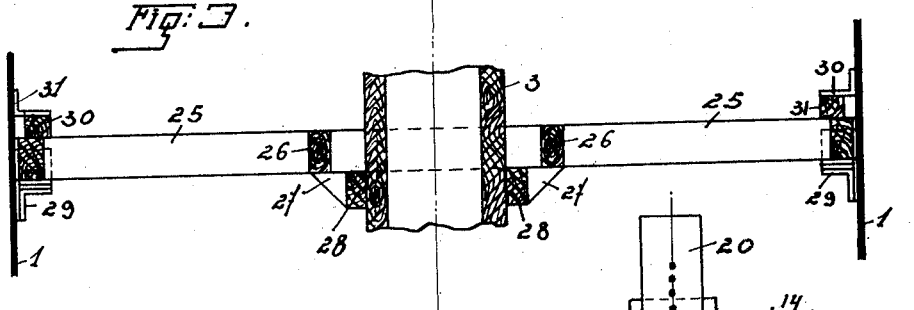
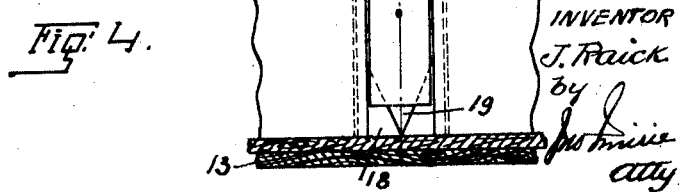

Patented Sept. 24, 1929

1,729,052

UNITED STATES PATENT OFFICE

JULIEN RAICK, OF BRUSSELS, BELGIUM, ASSIGNOR TO UNION MINIERE DU HAUT KATANGA (SOCIETE CONGOLAISE A RESPONSABILITE LIMITEE), OF BRUSSELS, BELGIUM

AGITATOR

Application filed June 28, 1926. Serial No. 119,205.

This invention relates to the agitators which are used in leaching plants for the treatment of ore pulp by a leaching solution and more particularly to agitators of that type in which the circulation of the pulp and leaching solution is produced by emulsifying the liquid through the action of an injection of air under pressure.

One object of the invention is to improve the operation of such an agitator and to cause the same to be more secure, more stable and more regular than hitherto, especially when the pulp which is to be treated contains an abnormal proportion of thick particles which tend to accumulate in the apparatus and to clog or obstruct the same.

Another object of the invention is to improve the efficiency of the apparatus by reducing the consumption of air under pressure without however interfering with the maintenance of the thick particles of the pulp in suspension through the emulsifying action of the air jet under pressure.

A further object consists in securing a better balance than hitherto between the inlet flow and the outlet flow of the agitator when, for any accidental cause whatever the feed varies suddenly.

And a still further object consists in securing a great homogeneity of the mixture in treatment whilst simultaneously providing means for classifying the drained material especially when a great proportion of coarse sands and stones are contained therein.

With these objects in view, the invention essentially consists in the special arrangements and combinations of parts as hereinafter fully described and pointed out in the appended claims.

Referring to the annexed drawings which show as an example, one embodiment of the invention:

Fig. 2 is a plan view of the agitator.

Fig. 3 is a section on line 3—3 of Fig. 2.

Fig. 4 is a section on line 4—4 of Fig. 1.

Figure 1:
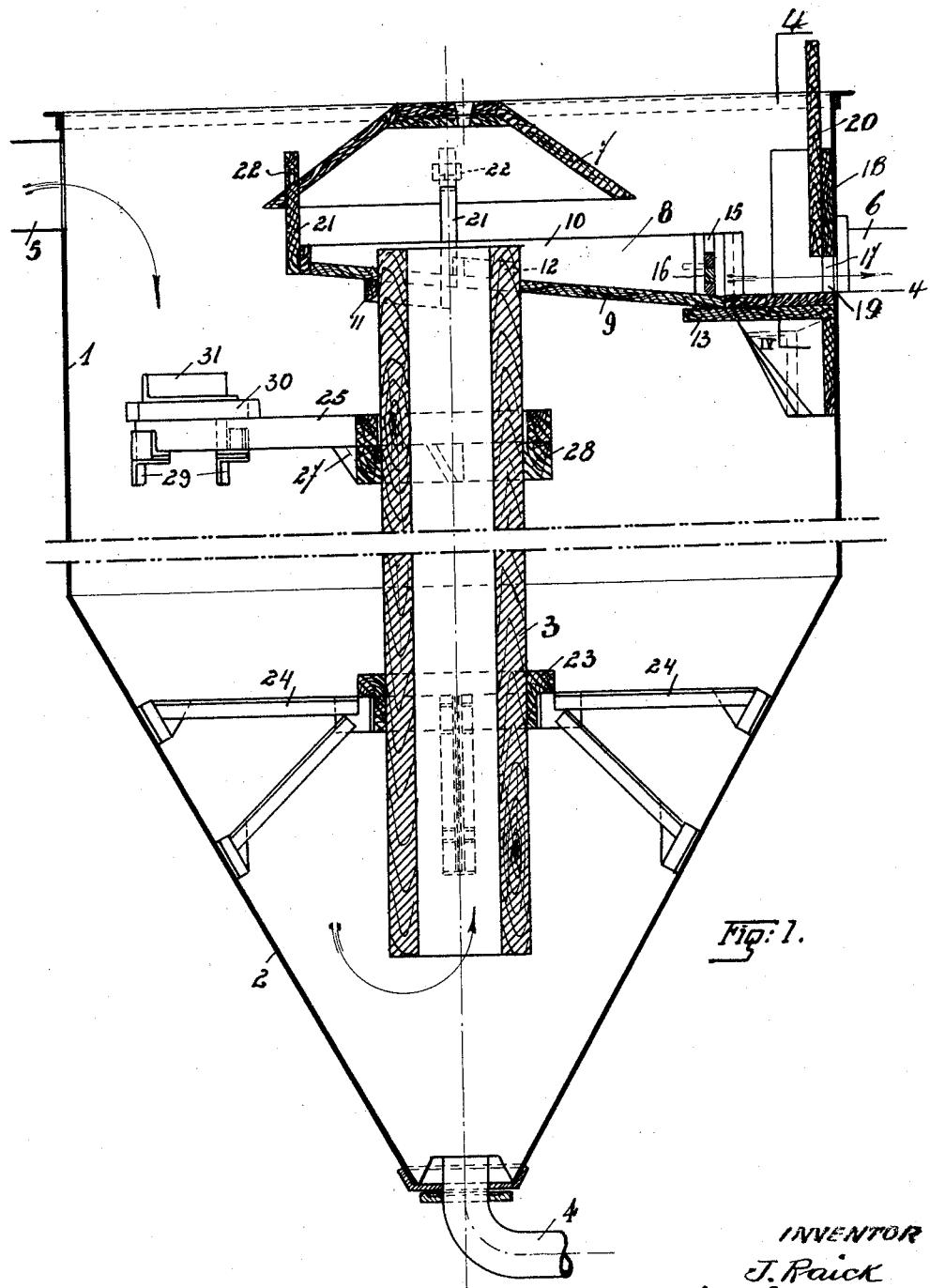
Fig. 1 is a vertical sectional view of an agitator made in accordance with the present invention.

As it is well known a leaching plant generally comprises a number of agitators in series, each agitator composed of a cylindrical vessel 1 (Fig. 1) open at the top and provided with a bottom flat or conical in the axis of which a central shaft 3 is provided. Each vessel 1 is further provided with a pipe 4 through which air under pressure can be fed in the vessel 1 under the central shaft 3. The leaching solution carrying the pulp to be treated is fed into the agitator 1 through an inlet channel 5 in such a manner that the liquid, being emulsified by the air under pressure, is caused to ascend in the central shaft 3 from which it overflows at the upper end, thus causing a circulation to take place between the bottom and the top of the vessel. This circulation maintains the whole mass of pulp in a continuous agitating movement. When a number of agitators are arranged in series, the agitator illustrated is connected to the next succeeding agitator by a pipe or launder 6 which is arranged below the normal level of the pulp contained in the agitator. The said pulp is discharged successively from the first agitator into the second and from the second into the third agitator and so on. On account of the segregation of the coarse particles in the first agitator the solution issuing therefrom has no more the same composition as the solution which has been fed therein. A similar action takes place in the second and subsequently in the third agitator in such a manner that the heavy particles of the pulp accumulate systematically on the bottom of each vessel which finally becomes clogged and must be stopped in order to be cleaned and unblocked. This inconvenience may be partly avoided, it is true, by increasing the delivery of the air under pressure so as to secure a more energetic emulsifying action assisting in maintaining the suspension of the heavy particles. This, however, increases the expense of motive power, without avoiding the inconvenience in a practically satisfactory manner. Another important drawback of the agitators generally employed in such a plant consists in the difficulty of maintaining the balance between the inlet flow and the outlet flow if the feed is subjected to variations.

As an example, in the case of a sudden increase of the inlet flow, the normal level in the vessel ascends and tends to cause the vessel to overflow on account of the insufficiency of the outlet pipe. Conversely, if the inlet flow diminishes suddenly the discharge opening becomes too great and the agitator becomes empty to a level which is too low for the regular operation.

According to the invention, and in order to avoid the said inconveniences, the agitator is constructed as follows:

The central shaft 3, which is maintained in a fixed position in the vessel 1, is surmounted by a cap 7, such as already has been used to avoid too violent splashing of the liquid, and is surrounded at its upper part, somewhat below the cap 7, with a pan 8 having an inclined bottom 9 and lateral walls 10. This pan, which is maintained on the central shaft between two strips 11 and 12 fixed to the central shaft on opposite sides, extends towards the discharge or overflow pipe 6 of the agitator and rests, at its end, adjacent to the overflow launder 6 on a kind of shelf 13 fixed to the inner periphery of the vessel 1 and provided with wearing pieces 14. It is provided in the lateral walls 10 with grooves 15 in which a variable number of pieces 16 are slid so as to form a dam against which a settling is produced during the operation. In the longitudinal axis of the pan 8 the vessel 1 is provided with a discharge opening 17 to which the overflow launder 6 is connected. The outlet flow through this discharge opening is controlled by aid of a discharge gate comprising a fixed piece 18 in which an angular opening 19 is cut away and a movable piece 20 which may be adjusted in a vertical direction so as to control the area of the angular opening 19 which remains free for the discharge.

In the example shown, the cap 7 is supported by the pan 8 by means of projecting supports 21 passing through holes in the cap 7 and receiving suitable wedges 22.

The central shaft 3 rests on its lower end by means of timbers 23 on brackets 24 fixed to the conical bottom 2 of the vessel and is centered in the said vessel by two beams 25 which are held parallel by cross pieces 26. Reinforce members 27 fitted to the underside of the beams 25 prevent the central shaft from moving sideways by bearing against strips 28 attached to opposite sides of the central shaft so as to prevent the same from floating under the hydrostatic pressure. The beams 25 are supported on the inner periphery of the vessel 1 by brackets 29 (Fig. 2) upon which they are maintained by wedges 30 which are pushed in under angle irons 31 on the inner periphery of the vessel.

With the above construction, all the parts of the agitator may be easily assembled and eventually dismounted and replaced in case of wear.

The operation is as follows:

The solution ascending in the central shaft 3 of each apparatus is projected against the cap 7 and falls in the pan 8 through which it is conducted against dam 16 which causes the flow to be divided into two parts, one part containing the average particles flows over the pan and is returned into the vessel 1; the other part passes over the dam 16 and escapes towards the discharge orifice which is controlled by the gate 18—20. The very coarse particles are carried away towards the dam 16 where they settle with the stones contained therein. Periodically they may be removed therefrom. In the meantime however they have been subjected to the action of the leaching solution during a relatively long period of time in such a manner that they are leached as much as possible. The pulp which is drained and carried over the dam then passes through the discharge orifice into the pipe 6 through which it is conducted to the second agitator as described with reference to Fig. 1.

Consequently on account of the operation of the pan 8 any danger of clogging is avoided and further the very coarse particles, which contain matters that must be dissolved are subjected during a long time to the action of the leaching solutions and these results are secured without increasing the delivery of air under pressure and consequently with a reduced expense of power.

The height that is given to the dam 16, which height can be adjusted at will by varying the number of superposed pieces forming this dam, controls the proportion of the solution which flows over the pan relatively to the proportion of the said solution which passes over the dam and is drained towards the discharge orifice. By removing momentarily the dam, the coarse sands contained in the pan can be washed away very rapidly, thus causing a rapid lowering of the level of the solution in the vessel of the agitator. In the case of pulps which are free from sand, the dam may be removed without inconvenience and the output of the agitator may be controlled by varying the slope of the bottom of the pan and the height of the triangular opening 19 of the discharge.

What I claim is:

1. In an agitator, a vessel, a central shaft therein, means whereby a mixture of liquid and material in suspension in the liquid is caused to ascend in the central shaft, a pan resting on the upper part of the central shaft, the said pan having an inclined bottom, a cap supported by the said pan above the upper end of the central shaft, a shelf supporting the pan at its end adjacent to the periphery of the vessel, an adjustable dam in the said pan at its end resting on the said shaft and an adjustable discharging gate adjacent to the periphery of the vessel, the said gate comprising a fixed piece in which an angular opening is cut away and a movable piece, adjustable in a vertical direction whereby the area of the angular discharging opening may be controlled.

2. In an agitator, a vessel, a central shaft in the vessel, means whereby a mixture of liquid and material in suspension is caused to move upwardly through the shaft, a cap arranged above the upper end of the shaft, a pan surrounding the shaft below the cap and extending laterally of the shaft, said pan inclining downwardly from the shaft, and a member adjustable at the lower end of the pan, said member providing a dam against which a settling of the material delivered into the pan may be produced.

3. In an agitator, a vessel, a central shaft in the vessel, means whereby a mixture of liquid and material in suspension is caused to move upwardly through the shaft, a cap arranged above the upper end of the shaft, a pan surrounding the shaft below the cap and extending laterally of the shaft, said pan inclining downwardly from the shaft, a member adjustable at the lower end of the pan, said member providing a dam against which a settling of the material delivered into the pan may be produced, the vessel being formed with a discharge opening in line with the lower end of the pan, and a gate for controlling the discharge opening.

In testimony whereof I have affixed my signature.

JULIEN RAICK.